United States Patent
Ki et al.

(10) Patent No.: US 11,809,722 B2
(45) Date of Patent: Nov. 7, 2023

(54) SYSTEM AND METHOD FOR MANAGING A MEMORY DEVICE USING INDEXES

(71) Applicant: Samsung Electronics Co., Ltd., Suwon-si (KR)

(72) Inventors: Yang Seok Ki, Palo Alto, CA (US); Jason Martineau, Milpitas, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/672,602

(22) Filed: Feb. 15, 2022

(65) Prior Publication Data

US 2022/0171554 A1    Jun. 2, 2022

Related U.S. Application Data

(63) Continuation of application No. 15/686,690, filed on Aug. 25, 2017, now abandoned.

(Continued)

(51) Int. Cl.
*G06F 3/06* (2006.01)
*G06F 16/901* (2019.01)
*G06F 16/903* (2019.01)

(52) U.S. Cl.
CPC .......... *G06F 3/0638* (2013.01); *G06F 3/0604* (2013.01); *G06F 3/067* (2013.01); *G06F 16/901* (2019.01); *G06F 16/90335* (2019.01)

(58) Field of Classification Search
CPC ................ G06F 3/0638; G06F 3/0604; G06F 17/30946; G06F 17/30979; G06F 17/30333; G06F 17/30312; G06F 17/30619
See application file for complete search history.

(56) References Cited

U.S. PATENT DOCUMENTS 8,433,695 B2   4/2013   Wu et al.
8,793,466 B2   7/2014   Shao et al.
(Continued)

FOREIGN PATENT DOCUMENTS

CN    105683898 A    6/2016
JP    2014130492 A   7/2014
(Continued)

OTHER PUBLICATIONS

Jin et al., KAML: A Flexible, High-Performance Key-Value SSD, IEEE International Symposium on High Performance Computer Architecture, Feb. 2017 [retrieved from internet Aug. 15, 2018][ <URL:https://cancer.shtech.org/wiki/uploads/KAML.pdf>] (Year: 2017).

(Continued)

*Primary Examiner* — David Yi
*Assistant Examiner* — Nicholas A. Paperno
(74) *Attorney, Agent, or Firm* — Lewis Roca Rothgerber Christie LLP

(57) ABSTRACT

A method for managing system resources includes receiving, by a storage device, a Quality of Service (QOS) parameter from a host. The storage device selects a first index type, from among index types, for a first index based on the QoS parameter and a computational load metric. The index types include one index type having an index structure that is a tree structure, a list structure, or a hash structure. The index structure is different from an index structure of another index type of the index types. The storage device sends feedback to the host regarding the first index type for the host to use in identifying a second index type for a second index to manage a computational load. The storage device accesses the data using the first index based on a processing of the user request, by the host, using the second index.

20 Claims, 4 Drawing Sheets

Related U.S. Application Data

(60) Provisional application No. 62/522,514, filed on Jun. 20, 2017.

(56) References Cited

U.S. PATENT DOCUMENTS

| | | | |
|---|---|---|---|
| 8,874,842 B1 | 10/2014 | Kimmel et al. | |
| 9,104,614 B2 | 8/2015 | Khmelnitsky | |
| 9,122,697 B1 | 9/2015 | Bono et al. | |
| 9,141,627 B2 | 9/2015 | Ota | |
| 9,448,924 B2 | 9/2016 | Sundaram et al. | |
| 9,461,944 B2 | 10/2016 | Fuente et al. | |
| 9,519,687 B2 | 12/2016 | Dickie | |
| 9,558,248 B2 | 1/2017 | Kirazci et al. | |
| 9,927,984 B2 | 3/2018 | Qiu et al. | |
| 10,025,673 B1 | 7/2018 | Maccanti et al. | |
| 2012/0005419 A1 | 1/2012 | Wu et al. | |
| 2013/0290343 A1 | 10/2013 | Kruglick | |
| 2014/0215129 A1* | 7/2014 | Kuzmin | G06F 12/0246 711/103 |
| 2014/0330785 A1 | 11/2014 | Isherwood et al. | |
| 2015/0106410 A1 | 4/2015 | Zaltsman et al. | |
| 2015/0220583 A1 | 8/2015 | Teletia et al. | |
| 2015/0302111 A1 | 10/2015 | Yue et al. | |
| 2015/0324125 A1 | 11/2015 | Li et al. | |
| 2016/0099810 A1 | 4/2016 | Li et al. | |
| 2016/0140052 A1 | 5/2016 | Waldspurger et al. | |
| 2016/0154833 A1 | 6/2016 | Isherwood, Jr. et al. | |
| 2016/0357763 A1 | 12/2016 | Salim et al. | |
| 2017/0139594 A1 | 5/2017 | Ahn et al. | |

FOREIGN PATENT DOCUMENTS

| | | |
|---|---|---|
| JP | 2015521310 A | 7/2015 |
| JP | 201776398 A | 4/2017 |
| KR | 2009-0071569 A | 7/2009 |
| KR | 2013-0030237 A | 3/2013 |

OTHER PUBLICATIONS

Hard Disk Controller, techopedia com, Jul. 21, 2013 [retrieved from internet Apr. 20, 20201[ <U RL:https://web.archive.org/web/20130721083417/https://www.techopedia.com/definition/18897 /hard-disk-controller-hdc>] (Year: 2013).

Torres, Anatomy of SSD Units, Hardware Secrets, Jan. 22, 2010 [retrieved from internet May 8, 20171[ <U RL:http://www .hardwaresecrets.com/anatomyofssdunits/2/>] (Year: 2010).

Wu, Chin-Hsien et al.; An Efficient B-Tree Layer for Flash-Memory Storage Systems, Department of Computer Science and Information Engineering, National Taiwan University, Taipei, Taiwan, 2003, 20 pages.

* cited by examiner

SYSTEM AND METHOD FOR MANAGING A MEMORY DEVICE USING INDEXES

CROSS-REFERENCE TO RELATED APPLICATION(S)

This application is a continuation of U.S. patent application Ser. No. 15/686,690, filed on Aug. 25, 2017, which claims the benefit of U.S. Provisional Application No. 62/522,514, entitled "DEVICE AND SYSTEM FOR A COOPERATIVE INDEX FOR RESOURCE-CONSTRAINED STORAGE SYSTEM," filed in the United States Patent and Trademark Office on Jun. 20, 2017, the entire contents of which are incorporated herein by reference.

BACKGROUND

A key value solid state drive (SSD) is an object storage device that can have multiple containers to use as internal management units. For example, a key value SSD may not require use of logical block addresses (LBAs) for accessing data stored therein but may rely on a key to access data associated with the key.

Storage devices, such as an SSD, typically have fewer computational resources than the host (or storage system) they are used in conjunction with. This limits the functionalities and performance that a storage device can provide for its indexes. Because of its constrained resources, it may be desirable to reduce indexing burdens of a key value SSD.

The above information disclosed in this Background section is only for enhancement of understanding of the background of the disclosure and therefore it may contain information that does not form prior art.

SUMMARY

Aspects of some example embodiments of the present disclosure relate to a system and method for managing a memory device.

According to some example embodiments, a system and method for managing a memory device includes a mechanism for leveraging the resources of the host (or storage system) to improve upon the functionalities and performance of a storage device, like an SSD, without overburdening said device with computationally intensive indexing operations.

According to some example embodiments of the present invention, in a method for managing a storage device, the method includes: receiving, by a host processor located on a host system, index requirements for an index, the index requirements comprising at least one of user service requirements or data access requirements; transmitting, by the host processor, to a storage processor located on a storage device, at least some of the index requirements for the index; receiving, by the host processor, parameters of a first index created by the storage processor utilizing a device profile of the storage device comprising at least one of computing capabilities or storage capabilities of the storage device, and the index requirements; building, by the host processor, utilizing the parameters of the first index and interacting with the first index, a second index that meets the index requirements.

According to some example embodiments, the device profile of the storage device comprise at least one of memory, capacity, controller performance, storage media, or performance.

According to some example embodiments, the host system comprises a personal computer or a server configurable to connect to a local or wide area network.

According to some example embodiments, the index requirements comprise at least one of quality of service for the storage device, ordering requirements for the data, query patterns, key distribution, value distribution, partial keys, or container capacity.

According to some example embodiments, a durable copy of the second index or metadata about the second index is stored in a container created on the storage device.

According to some example embodiments, the storage device comprises a key value solid-state drive.

According to some example embodiments, an index structure of the first index is only partially structured to decrease a computational burden on the storage device.

According to some example embodiments, at least one additional storage device is utilized that has a third index created in it that can be utilized cooperatively with the second index structure of the host system.

According to some example embodiments, an index structure of the second index is constructed dynamically.

According to some example embodiments, an index structure of the second index is constructed in part in response to access requests or queries for the data stored on the storage device.

According to some example embodiments, the method further includes identifying, by the processor, performance characteristics of the storage device in response to at least one of storage device driver loading, library loading, storage device opening, container opening, data access, or user input.

According to some example embodiments, an index structure of the second index is structured to be utilized cooperatively with indexes associated with multiple, different containers having competing needs.

According to some example embodiments of the present invention, a storage system includes: a host comprising a host processor and a host memory; and a storage device comprising a storage processor and a storage memory, wherein the host processor is configured to receive index requirements for an index, the index requirements comprising at least one of user service requirements or data access requirements, wherein the host processor is configured to transmit, to the storage processor, at least some of the index requirements for the index, wherein the storage processor is configured to determine a device profile comprising at least one of computing capabilities and storage capabilities of the storage device, wherein the storage processor is configured to build a first index utilizing the index requirements and the device profile, wherein the host processor is configured to receive parameters of the first index, and wherein the host processor is configured to build, utilizing the parameters of the first index, and interacting with the first index, a second index that meets the index requirements.

According to some example embodiments, the device profile comprise at least one of memory, capacity, controller performance, storage media, or performance.

According to some example embodiments, the host system comprises a personal computer or a server configurable to connect to a local or wide area network.

According to some example embodiments, the index requirements comprise at least one of quality of service for the storage device, ordering requirements for the data, query patterns, key distribution, value distribution, partial keys, or container capacity.

According to some example embodiments, a durable copy of the second index or metadata about the second index is stored in a container created on the storage device.

According to some example embodiments, the storage device comprises a key value solid-state drive.

According to some example embodiments, an index structure of the first index is only partially structured to decrease a computational burden on the storage device.

According to some example embodiments of the present invention, in a storage device including a storage processor and a memory and configured to be operatively coupled to a host, the storage processor is configured to: receive index requirements for an index, the index requirements comprising at least one of user service requirements or data access requirements; build a first index utilizing at least some of the index requirements and a device profile of the storage device, the device profile comprising at least one of computing capabilities or storage capabilities; transmit parameters of the first index to the host; and interacting with the host to generate a second index that meets the index requirements, wherein the first index and the second index are utilized cooperatively as the index for a storage system comprising the host and the storage device.

BRIEF DESCRIPTION OF THE DRAWINGS

A more complete appreciation of the present disclosure, and many of the attendant features and aspects thereof, will become more readily apparent as the disclosure becomes better understood by reference to the following detailed description when considered in conjunction with the accompanying drawings, wherein.

DETAILED DESCRIPTION

Figure 1:
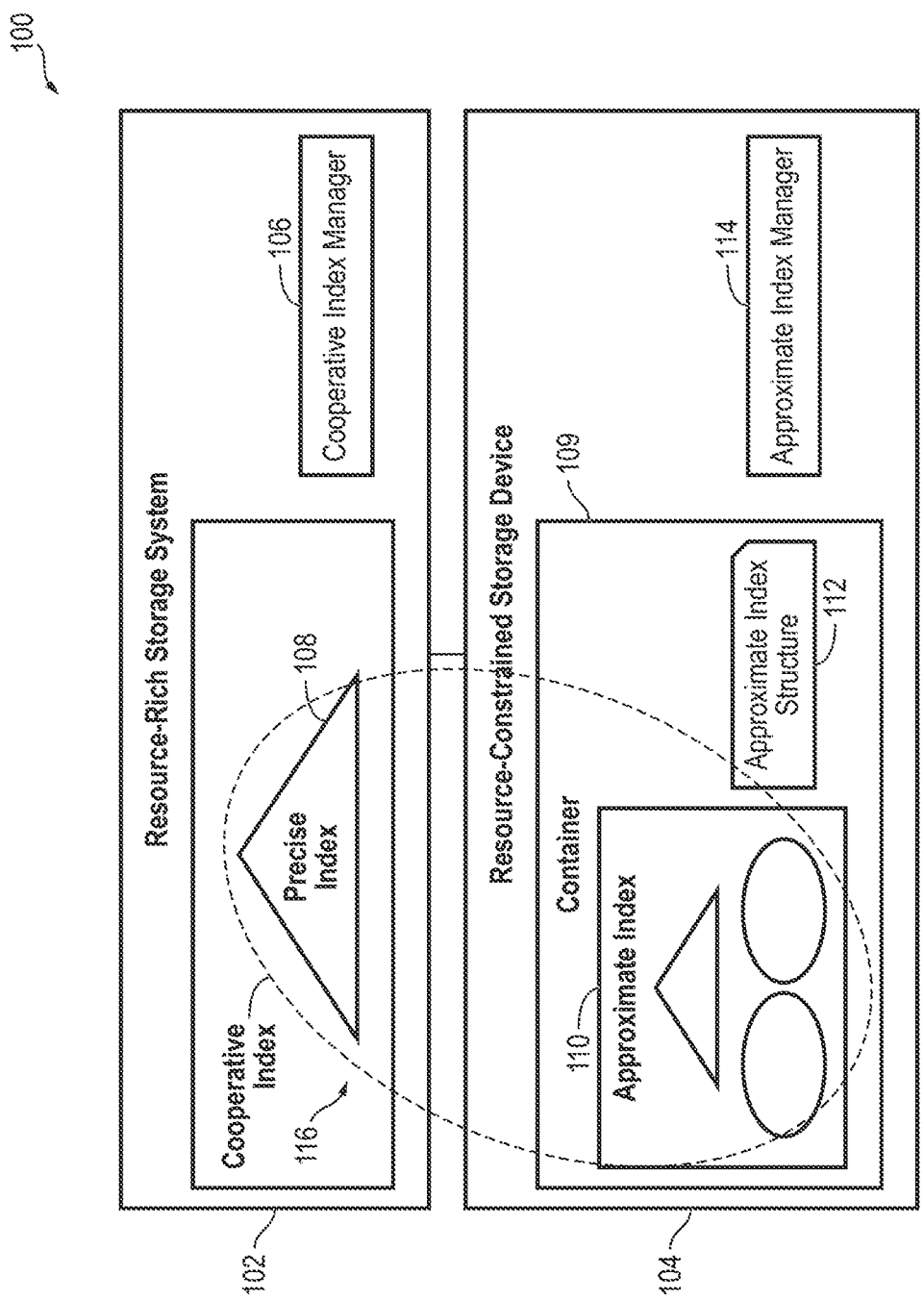
FIG. 1 is a block diagram illustrating aspects of a cooperative index structure operating as part of a memory system, according to some example embodiments of the present disclosure.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Aspects and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims.

The use of the terms "a" and "an" and "the" and similar referents in the context of describing the invention (especially in the context of the following claims) are to be construed to cover both the singular and the plural, unless otherwise indicated or clearly contradicted by the context. The terms "comprising," "having," "including," and "containing" are to be construed as open-ended terms (i.e., meaning "including, but not limited to,") unless otherwise noted.

Unless defined otherwise, all technical and scientific terms used herein have the meaning as commonly understood by one of ordinary skill in the art to which this invention belongs. It is noted that the use of any and all examples, or example terms provided herein is intended merely to better illuminate the invention and is not a limitation on the scope of the invention unless otherwise specified. Further, unless defined otherwise, all terms defined in generally used dictionaries may not be overly interpreted.

To manage objects efficiently, each container may have an index to locate objects in that container. The index can be any suitable type of index, and may have one or more features including, but are not limited to, point query, range query, and ordered access. According to one or more example embodiments, an index structure is a data structure for an index that is configured to enable ease of use and/or to improve efficiency or speed of data finding/retrieval/access operations of a storage device. In one aspect, embodiments of the present invention may enhance the index capabilities of a storage device by creating a cooperative index structure implemented in the form of a precise index (e.g., a second index) on the host (a host system or a storage system) and one or more approximate indexes (e.g., first indexes) for use within containers on one or more storage devices, such as key value solid-state drives (SSDs). The storage system according to example embodiment of the present invention refers to a host that may include a processor and that is more rich in compute resources than a storage device (e.g., a drive such as a key value SSD). One or more storage devices may be operatively coupled to the storage system. Alternatively, a storage system may refer to both a host and one or more storage devices operatively coupled thereto. Said cooperative index structure allowing for more computationally intensive indexing tasks to be performed by the more resource-rich host (storage system) while it leverages the index structures of the approximate indexes to provide the user with a useful index having enhanced efficiency.

As a non-limiting example of a type of storage device that may be used in an embodiment of the present invention, a key value solid-state drive (SSD) is an object storage device which can have multiple containers to use as internal management units. To manage the objects within a container efficiently, each container has an index that can be used to locate objects within the container. There are many types of indexes that may be used, as would be known to one skilled in the art, and a well-implemented index can have many features. For example, a good index might provide the user with the ability to perform a point query or a range query. It might also, for example, provide ordered access to the user for the objects stored within the container.

Storage devices, such as SSDs, typically have fewer computational resources than the host (or storage system) they are used in conjunction with. This limits the functionalities and performance that a storage device can provide for its indexes. Because it is common that a user of such a storage device or devices may need more functionality than the storage device or devices can natively provide, what is needed is a mechanism to provide useful, functional indexes to users while decreasing the burden on the individual storage devices.

FIG. 1 depicts an embodiment of the present invention within a System 100 wherein the Storage System 102 hosts the Precise Index 108 and the Cooperative Index Manager 106. The Storage System 102 may include a processor, a memory, a user interface, and other componentry or programming as would be known to a person skilled in the art. For example, the Storage System 102 may be embodied as a personal computer or as a server for use in conjunction with a local or wide area network. By way of example, a host (or a host system) according to some example embodiments may be a server that includes both a processing unit and a storage unit. The host has more resources than a storage device, and has a precise index that can cooperatively operate with an approximate index (e.g., a first index) of the storage device, and has a host library to implement enhanced functionalities for the storage device by leveraging capabilities of the device. The host library is a host software that operates (e.g., codes) at the host level to handle operations that the host is responsible for. The host library may also provide hints to the storage device as to how approximate indexes may be built conceptually. However, the approximate indexes for the containers are built at the storage device level. According to embodiments of the present invention, the host may not necessarily be an end-user machine, but may be any suitable system, device or devices with more enhanced resources (e.g., computational capabilities) than the individual drives themselves, and may a server, a network-attached storage apparatus, and/or the like. Hence, the host may also be referred as a resource-rich storage system or a less resource-constrained storage system.

A Storage Device 104, or in an alternative embodiment a plurality of Storage Devices 104, may be used in conjunction with the Storage System 102. Said Storage Device 104 may be embodied, for example, as a key value solid state drive (KV SSD); although other types of storage devices known in the art to be suitable for use as key value storage media or any other suitable drive known to those skilled in the art may be used. The Storage Device 104 hosts an Approximate Index Manager (AIM) 114 and may also host a Container 109. The container 109 (and/or one or more additional containers) according to some example embodiments are generally created at the request of the user/host/system. The Approximate Index Manager 114 according to example embodiments sits conceptually outside of the container, and manages or is configured to manage the approximate indexes across all containers on the drive (e.g., the storage device 104). Within the Container 109 is an Approximate Index 110 and the corresponding Approximate index Structure 112. In an alternative embodiment, a Storage Device 104 may host a plurality of Containers 109, each having a corresponding Approximate Index 110 and potentially different Approximate Index Structures 112. The Approximate Index Manager 114 generates or builds the Approximate Index 110. For example, the Approximate Index Manager 114 is implemented by a software (or firmware) running in a storage processor located in the Storage Device 104. According to example embodiments, the Approximate Index Manager 114 may receive suggested index types and/or index structures from the Cooperative Index Manager 106 and determine the Approximate Index Structure 112 and/or build the Approximate Index 110 accordingly.

An Approximate Index 110 is a lightweight, perhaps partially structured, index in a resource-limited device, such as a Storage Device 104. Said Approximate Index 110 may have limited functionalities and/or be less accurate or complete than the Precise Index 108. Generally speaking, the Approximate Index 110 may have an index type and Approximate Index Structure 112 that does not require an amount of computation that may be overly burdensome on the limited resources of a Storage Device 104. An Approximate Index 110 may support ordering, although support for ordering is not required. Accordingly, if the Approximate Index 110 supports ordering, it may be partially or totally ordered. An approximate Index 110 may be created when a Container 109 is created, and the Approximate Index 110 remains associated with the Container 109. Alternatively, an Approximate Index 110 may be created after creation of the corresponding container. An Approximate Index 110 is constructed according to an Approximate Index Structure, which is built by the Approximate Index Manager 114 and used as a guide to build the Approximate Index. This is done in consideration of one or more of, but not limited to, device resources, the nature of the index data, the nature of the queries, and the cooperative index operational requirements, and/or the like. After the creation of the Approximate Index 110 its structure remains fixed. However, if changes are required, an Approximate Index 110 may be deleted or recreated (or rebuilt) with a new structure. In embodiments of the present invention where more than one Container 109 is used, including embodiments where a plurality of Storage Devices 104 are used, each Container 109 can have an associated Approximate Index 110 and each of said indexes may have a different Approximate Index Structure 112.

A Precise Index 108 is an index in a resource-rich Storage System 102 that provides enhanced functionality to one or more Approximate Indexes 110. Generally speaking, a Precise Index 108 is an on-demand index, and will typically be the index level that a user might interact with. For example, if a user was sending a query to a System 100 embodied as a server with an SSD connected to it serving as a Storage Device 104, then the user's request would be processed by the Storage System 102 by searching the Precise Index 108 located on said Storage System 102. Then, if it was necessary to access the Approximate Index 110 on the Storage Device 104, the Approximate Index 110 could be utilized to quickly provide the data requested to the Precise Index 108. This leveraging of the Approximate Index 110 allows the Precise Index 108 to provide the needed functionality to fulfill the user's request while removing the complex indexing demands from both the resource-limited Storage Device 104 and the resource-rich Storage System 102. In other words, the cooperative index according to example embodiments reduces the burden on both the storage system 102 and the storage device 104. For example, in a purely host-based system, much of host resources (and/or many IO requests to the drives) may be utilized or required for indexing purposes. Alternatively, if the index were just on the drive, it may require significantly more processing capabilities than are actually present. Hence, the burden may be fairly split between the host and the drive.

A Precise Index 108 is built on top of one or more Approximate Indexes 110, and it is structured so as to supplement the functionality of the Approximate Indexes 110, which may be partially structured, to provide the user with a functional and useful index that has increased efficiency. Said increased efficiency results from the Precise Index 108 and allows for some of the computationally intensive indexing tasks to be executed using the Storage System 102 resources, which are typically greater than those of a Storage Device 104. A Precise Index 108 may be created in response to an input from a user, the Storage System 102, or a Storage Device 104. Hence, the Precise Index 108 may be built based on both the user requirements and the Approximate Index 110 of the storage device, which would be limited by the functional and storage capabilities of the storage device. The creation of a Precise Index 108 may also be performed statically or dynamically at Storage Device 104 driver loading time, at library loading time, at Storage Device 104 opening time, at Container 109 opening time, and/or at object access time. Additionally, a Precise Index 108 may be created in its entirety or incrementally on demand, loading all information from the Approximate Index 110 or Approximate Indexes 110 or only a portion of the information based on access patterns. As discussed below in regards to the Durable Cooperative Index 124, a Precise Index may be persisted to either the memory of the Storage System 102 or to the Storage Device 104. If the Precise Index 108 is located within the volatile memory of a Storage System 102, then creating a Durable Cooperative Index 124 located on the Storage Device 104 may be performed to allow for the reconstruction or recovery of the Precise Index 108 when, for example, a device is closed or the System 100 power is turned off. In some situations, and for some embodiments, the Precise Index 108 need not be persisted to memory, and can be thrown away and recreated when necessary.

Also depicted is a conceptual representation of the Cooperative Index 116 that is conceptually implemented between the Precise Index 108 and the Approximate Index 110 indicating its relationship across the Storage System 102 and the Storage Device 104. For example, the cooperative index is "the concept" of the precise and approximate indexes being managed and used together to provide the ultimate usability and properties according to example embodiments of the present invention. Said Cooperative index 116 is an index structure that utilizes a Precise Index 108 located on the computationally resource-rich Storage System 102 to provide enhanced functionality to the one or more Approximate Indexes 110 that it is built upon. This structure is informed by the Cooperative Index Manager 106 as is discussed in more detail below.

Figure 2:
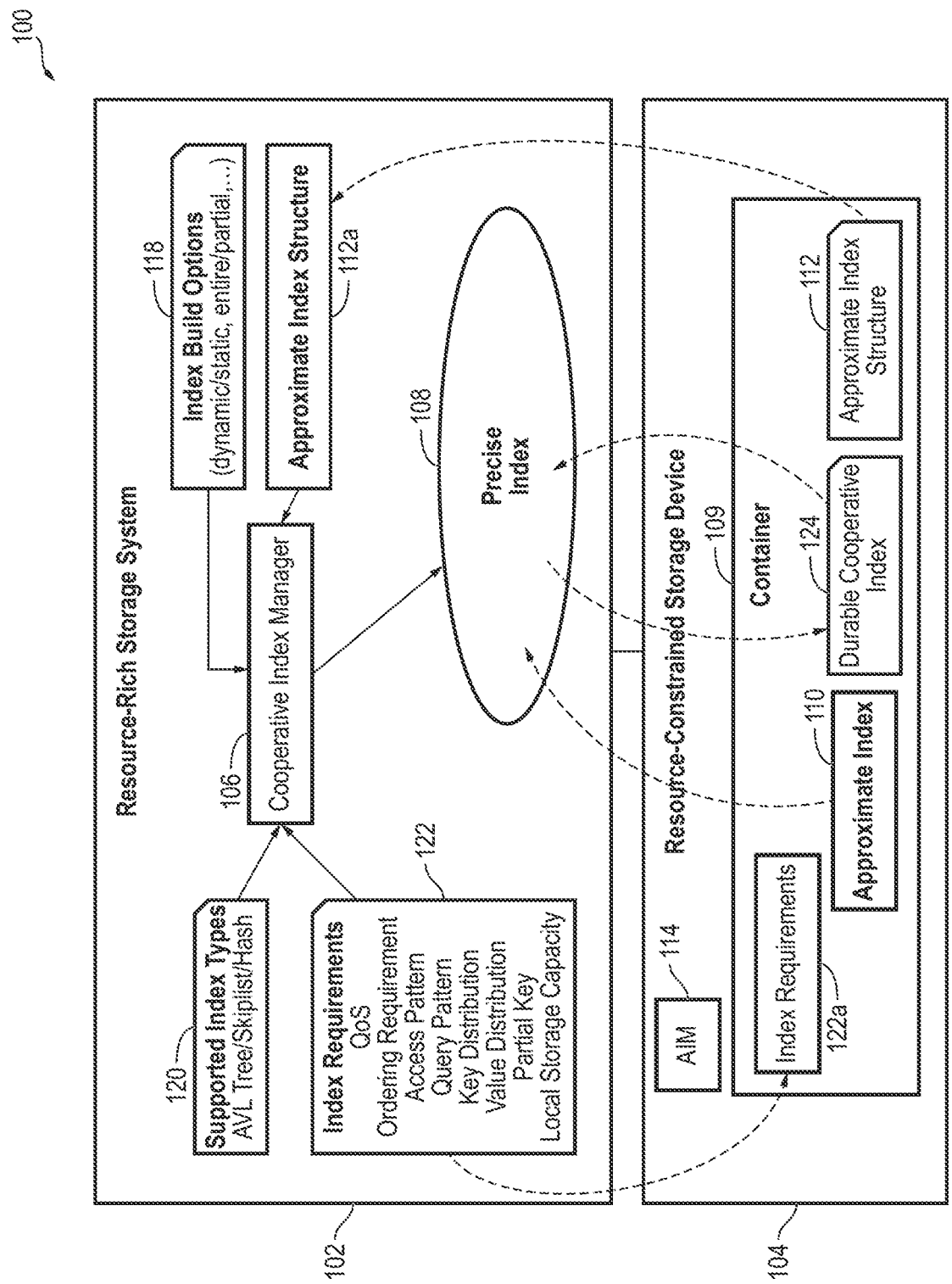
FIG. 2 is a block diagram illustrating further details of the cooperative index manager illustrated in FIG. 1, according to some example embodiments of the present disclosure.

FIG. 2 depicts an example operation of the Cooperative Index Manager 106. In determining what type of index structure should be used for the Precise Index 108, the Cooperative Index Manager 106 considers the Index Build Options 118, the Supported Index Types 120, the Index Requirements 122, and the Approximate Index Structure 112a that it receives from the Storage Device 104. For example, Cooperative Index Manager 106 receive information regarding the Supported Index Types 120, which may include, for example, a tree (e.g., an AVL tree), a list (e.g., a skiplist), and a hash. One skilled in the art will recognize that there are many more data structures that might be used for indexing purposes which are not explicitly disclosed herein, but are within the scope of the inventive concept. The Cooperative Index Manager 106 then considers the Index Requirements 122 to be implemented in the cooperative index according to a supported index type, which requirements may include one or more of, but are not limited to, Quality of Service (QoS), ordering requirements, access pattern, query pattern, key distribution, value distribution, partial key searching, and local storage capacity. Here, QoS, ordering requirements, access pattern, partial key search, and query pattern might be user requirements, whereas key distribution, value distribution, and container capacity are physical or logical requirements. The Index Build Options 118 may include one or more of dynamic/static, entire/partial, etc., but are not limited thereto. The Cooperative Index Manager 106 also receives information on the Approximate Index Structure 112a, and determines a corresponding index type, index structure and a build plan. Based on the supported index type and other information received by the Cooperative Index Manager as stated above, the precise index may correspond to a specific type and structure of index that best meets the various requirements, such as a tree, a list or a hash, for example. In some embodiments, the Cooperative Index Manager 106 may be in communication with a plurality of Approximate Index Managers 114 that may be embodied within a plurality of Storage Devices 104.

A pair of Index Build Options 118 are provided as non-limiting examples of the types of options that may be considered by the Cooperative Index Manager 106. For example, the index as described above may optionally be dynamic or static, and the index may also be entire or partial, but is not limited thereto. Similarly, a few examples of the types of indexes that may be used are provided within the Supported Index Types 120. For example, the types of indexes that are supported as described above may include an AVL tree (e.g., a tree), a skiplist (e.g., a list) or a hash, but are not limited thereto. These example index types are intended to be non-limiting, and other index types, as known to one skilled in the art, may be used within the scope of the present invention. A non-exhaustive list of the types of requirements contained within the Index Requirements 122 is also provided.

Also depicted are the Index Requirements 122a, the Approximate Index 110, Approximate Index Structure 112, and the Durable Cooperative Index 124 stored within the Container 109. The Index Requirements 122a are communicated from the Cooperative Index Manager 106 to the Approximate Index Manager 114 on the Storage Device 104 that creates the Container 109 and the contents depicted within it. The index requirement may include one or more of, but is not limited to, QoS, ordering requirement, access pattern, query pattern, key distribution, value distribution, partial key and local storage capacity. A plurality of Containers 109 in the Storage Device 104, may each contain its own Approximate Index 110 and Approximate Index Structure 112. In an alternative embodiment, there may be a plurality of Storage Devices 102 that may be used within the scope of the present invention.

The Durable Cooperative Index 124 may be constructed as either a copy of a Precise Index 108 associated with an Approximate Index 110 within a Container 109 that is fully persisted to the Storage Device 104, or as a metadata file or other data structure within a Container 109 that can be used to quickly reconstruct a Cooperative Index 116 should such reconstruction be necessary or desired.

As a non-limiting example of a situation in which such reconstruction might be desirable, if the Storage Device 104 were disconnected from the Storage System 102 and then connected to a different System 100 having a different Storage System 102, the Durable Cooperative Index 124 would allow for the accelerated creation of a Cooperative Index 116 within the new System 100. This could be achieved either by duplicating the fully persisted copy of the Cooperative Index 116 within the new Storage System 104, or by using the metadata file to inform the Cooperative Index Manager 106 of the new Storage System 102 as to what type of index could be used without having to re-perform the process of determining the appropriate index type.

Figure 3:
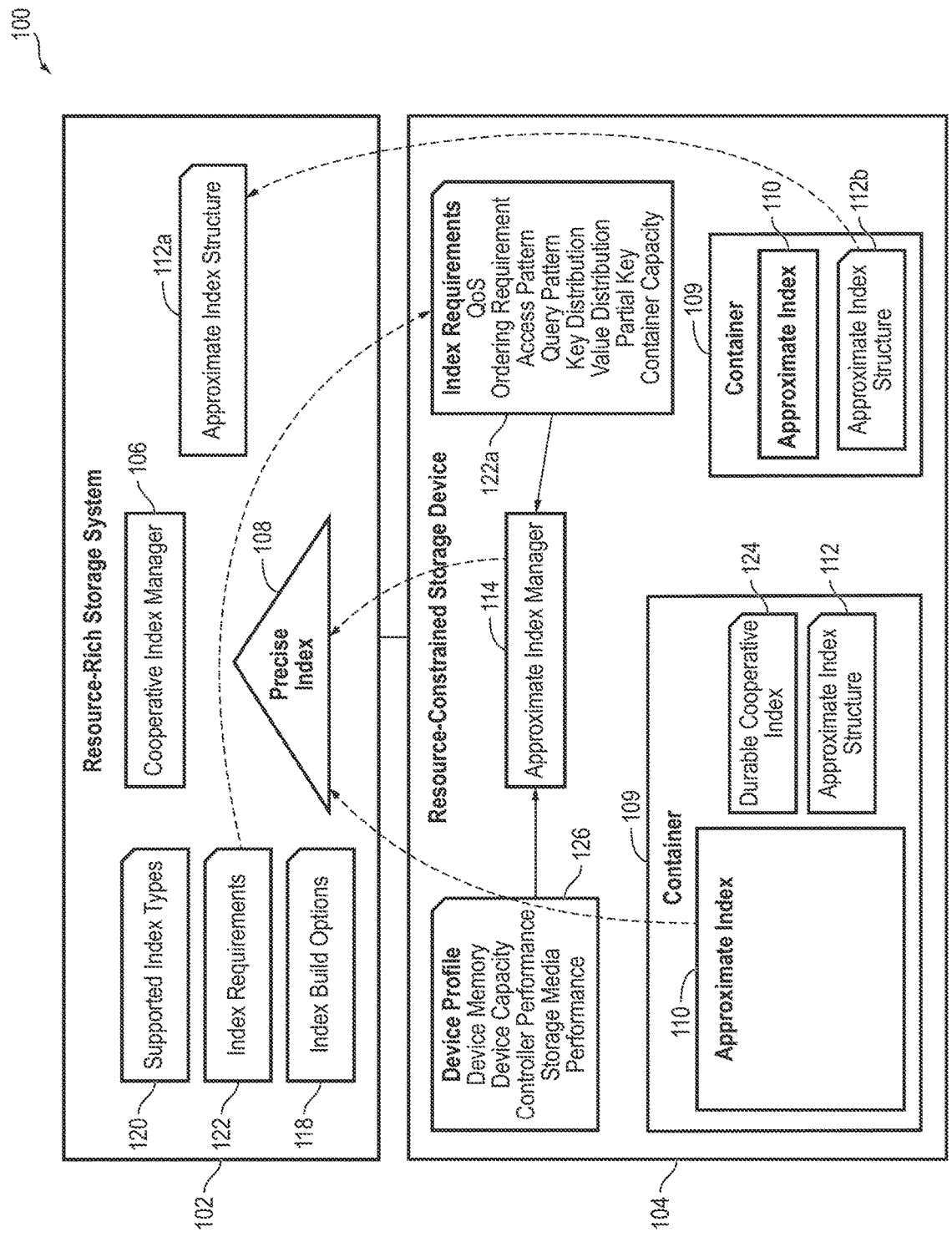
FIG. 3 is a block diagram illustrating aspects of the storage device utilizing a cooperative index, according to some example embodiments.

FIG. 3 depicts an example operation of the Approximate Index Manager 114. In some embodiments, and as illustrated in FIG. 3, the Approximate Index Manager 114 may be operated on the Storage Device 104. As shown in FIG. 3, the Approximate Index Manager 114 receives information regarding a Device Profile 126, which may include one or more of, but is not limited to, device memory, device capacity, controller performance, storage media, and other performance related metrics. Further, the Approximate Index Manager 114 also receives Index Requirements 122a, which may include one or more of, but are not limited to, QoS, ordering requirement, access pattern, query pattern, key distribution, value distribution, partial key, and container capacity. By utilizing the device profile and the index requirements thus provided, the Approximate Index Manager determines or is configured to determine the specific approximate index form to be used. Some embodiments of the present invention may have a plurality of Approximate Index Managers 104 operating on a plurality of Storage Devices 104.

As shown, The Approximate Index Manager 114 may consider the Device Profile 126 of the Storage Device 104 and the Index Requirements 122a, as sent by the Cooperative Index Manager 106, when deciding what containers to index, and/or what Approximate Index Structures 112, 112b, and Approximate Indexes 110 to construct. The Approximate Index Manager 114 may also determine a sorted set of types and parameters, and/or an unsorted key set of types and parameters. The optional Durable Cooperative Index 124 is depicted within one of the Containers 109 to illustrate that it may be constructed for use as needed. However, within the scope of the present invention the Durable Cooperative Index 124 may be located elsewhere, for example, within a separate Container 109 on the Storage Device 104.

Presented within the Index Requirements 122a is a non-exhaustive list of the type of requirements that may be considered by the Approximate Index Coordinator 114. As discussed above, the Index Requirements 122a may include one or more of, but are not limited to, QoS, ordering requirement, access pattern, query pattern, key distribution, value distribution, partial key, and container capacity. Similarly, a non-exhaustive list of the device characteristics that may be considered are provided within the depiction of the Device Profile 126, which may include as discussed above one or more of, but are not limited to, device memory, device capacity, controller performance, storage media, and performance. Within the Storage System 102, the Supported Index Types 120, Index Requirements 122, and the Index Build Options 118 are considered by the Cooperative Index Manager 106 in determining what instructions to communicate to the Approximate Index Manager 114, and in determining what index structure to use in constructing the Precise Index 108. For example, the Index Build Options 118 may include one or more of, but are not limited to, dynamic/static, entire/partial, and/or the like. Further, the Supported Index Types may include one or more of, but are not limited to, a tree (e.g., an AVL tree), a list (e.g., a skiplist), and a hash. The Index Requirements 122 may include one or more of, but are not limited to, QoS, ordering requirement, an access pattern, a query patter, a key distribution, a value distribution, and partial key, and local storage capacity. As shown, the Precise Index 108 may be constructed for use in conjunction with multiple Containers 109, each containing a separate Approximate Index 110. Additionally, said multiple Containers 109 may be located within a plurality of Storage Devices 104 in communication with the Storage System 102.

Figure 4:
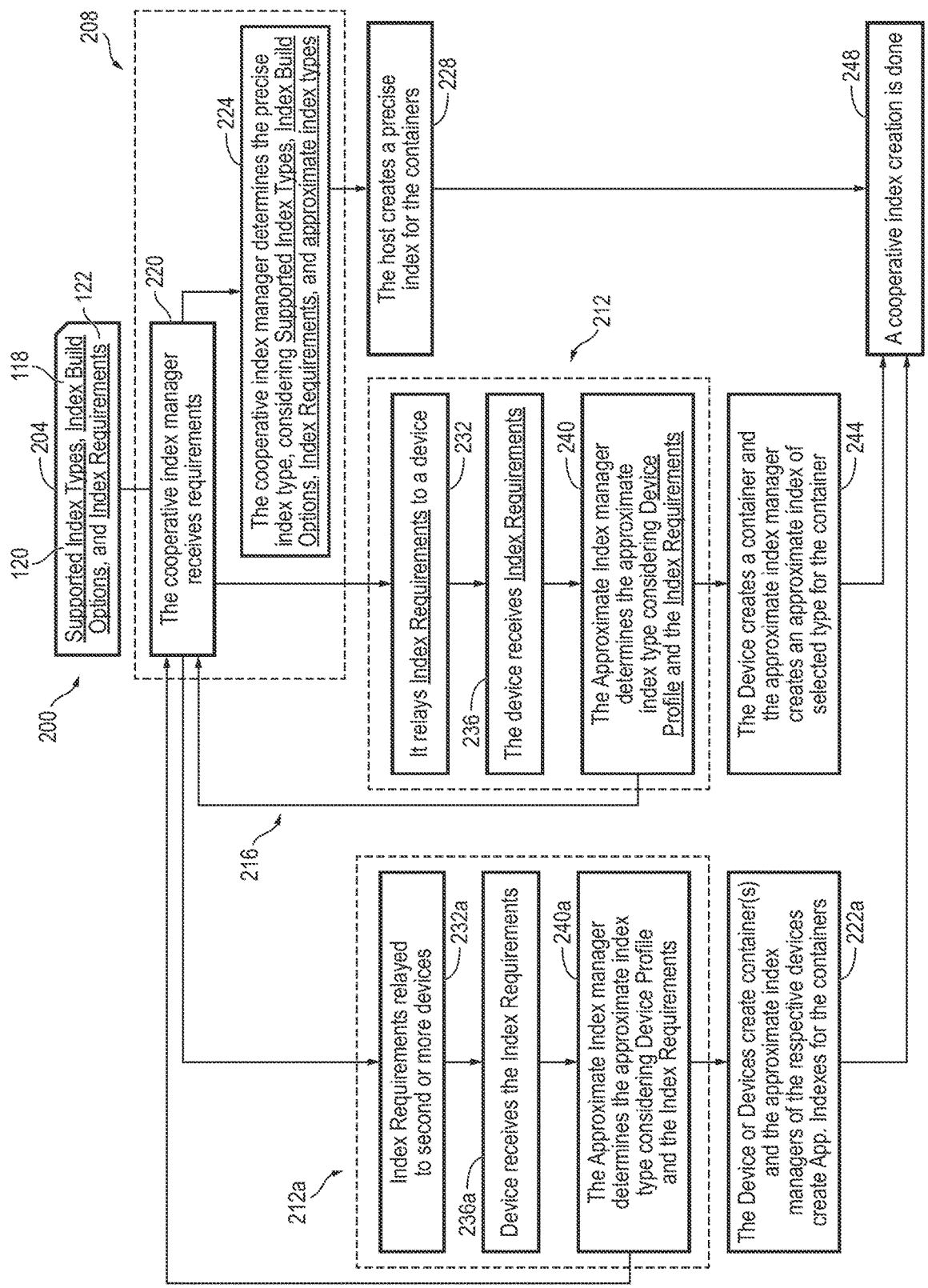
FIG. 4 is a flow diagram illustrating an example process for creating a cooperative index according to some example embodiments.

FIG. 4 is a flowchart illustrating an example of a Process 200 implemented by a Storage System 102 in communication with a Storage Device 104 for creating a Cooperative Index 116. In some implementations, the Process 200 will create the Cooperative Index 116 as comprising a Precise Index 108 located on a Storage System 102 that is in communication with a Storage Device 104 containing at least one Container 109 having an Approximate Index 110. In other implementations, the Process 200 may construct the Cooperative Index 116 across a Precise Index 108 located on a Storage System and a plurality of Storage Devices 104 or across multiple Containers 109 located on a single Storage Device 104. Accordingly, the following section describes the Process 200 as being performed by components of the System 100. However, the Process 200 may be performed by other alternative embodiments or configurations of the present invention.

In some implementations of the Process 200 according to some example embodiments, at 204 the Supported Index Types 120, Index Build Options 118, and the Index Requirements 122 may optionally be requested by the Cooperative Index Manager 106. In some embodiments, the process may simply start with the receipt of the above information. Alternatively and within the scope of the present invention, in some embodiments, the request for the information to be sent to the Cooperative Index Manager 106 above may originate from a different component of the System 100, for example the Approximate Index Manager 110 located on a Storage Device 104. These requests may be triggered by a variety of events. For example, while not limited to these events, events such as a prompt from a user, installation of a new Storage Device 104 or Storage Device driver, or powering on the System 100 may trigger the request for the information listed above to be sent to the Cooperative Index Manager 106.

At 220, the Cooperative Index Manager 106 receives the requirements for the Cooperative Index 116 described above. This operation is typically performed within the Storage System 102, and the operations carried out within the Storage System 102 are depicted within section 208.

Additionally, at 220, the Cooperative Index Manager 106 analyzes the Supported Index Types 120, the Index Build Options 118, and the Index Requirements 122. The Cooperative Index Manager 106 may also forward index requirements to a Storage Device 104 as functional requirements. In some embodiments, where there is more than one Storage Device being used, the Cooperative Index Manager 106 may forward index requirements to each of the Storage Devices 104 being used. For example, there may be at least two types of build plans according to embodiments of the present invention. At least one build plan may be for a precise index, and at least one other build plan may be for one or more approximate indexes. For example, the levels or respective plans may not dictate plans for each other.

In general, the cooperative index does not strictly or strongly dictate things for the approximate index. The cooperative index may offer index requirements, but these may be functional requirements and may not necessarily be requirements for a specific type of index. The approximate index manager may determine which specific type of index to use on its own, given the constraints of the index requirements and its own device characteristics. In some cases, once the approximate indexes decide which index types they will use, the precise index type may be chosen based on the feedback. It should be noted that physical capabilities of the drive cannot change. Hence, if a certain type of index needs to be used to meet the requirements of the drive, the precise index should be chosen to best "fit" with the choice of the approximate index.

An example decision table for picking precise and approximate indexes according to example embodiments of the present invention is provided below.

| Index Requirement | Lookup Speed | Best | Good | Fair |
|---|---|---|---|---|
| | Lookup Consistency | Best | Good | Fair |
| | Ordering | Ordered | Arbitrary | |
| | Access Pattern | Sequential | Random | |
| | Host memory | 8 GB | | |
| Build Option | Dynamics | Static | Dynamic | |
| | Completeness | Partial | Entire | |
| Device Profile | Memory | 1 GB | | |
| | Storage | 1 TB | | |
| Supported Index | Precise Index | AVL Tree | Skiplist | Hash Table |
| | Approximate Index | Splay | Skiplist | Monotone Hash Table |

By way of a non-limiting example, if the index is required to support for ordering and sequential access by a user, then in order to provide the best lookup speed and consistency, using a splay index structure as the Approximate Index 110 cooperatively with a Precise Index 108 using an AVL Tree structure would constitute a best Build Plan. Here, the Approximate Index Manager 114 may first receive index requirements as well as optional suggested index types and/or index structures from the Cooperative Index Manager 106, determine the Approximate Index 110 based on the index requirements and optionally in view of the suggested index types and/or index structures, and provide it as a feedback to the Cooperative Index Manager 106 for the creation of a corresponding Precise Index 108.

Alternatively, when the access pattern of the user is random and the ordering of the object data may be arbitrary, then both the Precise Index 108 and the Approximate Index 110 may be structured as skiplists to constitute a Build Plan. Or, as another example, if the Container 109 has a small number of large, relatively unchanging data items and the queries for the data that tend to be point and range oriented based on a small number of variables, the Approximate Index 110 may use a trie structure and the Precise Index 108 may also use a trie structure. As such, a structure may allow for the Precise Index 108 to leverage the substantial order given to the data by the Approximate Index 110.

In yet another alternative embodiment, a Precise Index 108 may have a skiplist structure and an Approximate Index 110 may have a monotone hash table structure to constitute a Build Plan. Such a monotone hash table may support fast and consistent look up with partial order support. The skiplist structure of the Precise Index 108 may leverage the partial order provided by the monotone hash table structure of the Approximate Index 110 by requesting sorted groups when making a query. The objects within a group of the monotone hash table are not fully sorted, allowing for fast processing by the Storage Device 104, and the unsorted objects can be sorted by the Storage System 102 when the groups are inserted into the skiplist Precise Index 108.

There are many possible combinations of index structures known to those skilled in the art that may be used within the scope of the present invention, and the above examples are intended only to illustrate a few possible suitable combinations as might be considered under some circumstances.

At 232, the Index Requirements are relayed to a Storage Device 104. In an embodiment where there is more than one Storage Device being utilized, the Index Requirements for each Storage Device may be relayed as illustrated by 232a. Because the creation of the Precise Index 108 can be done in partial steps or as a complete index, and because it can be created statically or dynamically, in an embodiment with more than one Storage Device 104 the relaying of information to the Storage Devices 204 illustrated in 232 and 232a may be performed in iterations or in parallel according to the present invention. Further, according to example embodiments, the Approximate Index Manager 114 may provide a feedback regarding the Approximate Index 110 and/or the Approximate Index Structure 112 to the Cooperative Index Manager 106 for generation of a corresponding Precise Index 108.

At 236, the Index Requirements are received by the Storage Device 104. In an embodiment where more than one Storage Device is used, as illustrated in 236a, the receipt of the Index Requirements for a plurality of Storage Devices 104 may be performed.

Following the receipt of the Index Requirements, at 240 the Approximate Index Manager 114 determines the appropriate index type considering the received information and the Device Profile 126. The Device Profile 126 includes information about the computational resources available to the Storage Device 104 and the types of performance it can provide. For example, this may include, but is not limited to, information regarding the device memory, the device capacity, controller performance, storage media, and other relevant specifications about the Storage Device 104 as might influence its performance. In embodiments having multiple Storage Devices 104, as illustrated in 240a, each of Approximate Index Manager 114 of said storage Devices 104 may determine the approximate index type based upon the information it received from the Cooperative Index Manager 106 and the relevant Device Profile 126.

Once a determination of the Approximate Index Type has been made by the Approximate Index Manager 114, at 216 the Approximate Index Type is relayed back to the Cooperative Index Manager 106 of the Storage System 102. In embodiments of the present invention heaving more than one Storage Device 104 and more than one Approximate Index Manager 114, each of said Approximate Index Managers 114 may relay the Approximate Index Type for its respective Storage Device 104 back to the Cooperative Index Manager 106 as illustrated by 216a. This relaying of information from the plurality of said Storage Devices 104 as represented by 216a may take place concurrently with the relaying of 216, but it is not limited to being concurrent. Similarly, if there are multiple Approximate Index Types to be relayed back to the Cooperative Index Manager 106, then said relays may take place in a sequence or in parallel.

At 224 the Cooperative Index Manager 106 take the Approximate Index Type, or Approximate Index Types when more than one Approximate Index has been used, and determines the Precise Index type. Additional information may be considered by the Cooperative Index Manager at this point, such as but not limited to the Supported Index Types, Index Build Options, and Index Requirements.

Following the determination of the Precise Index type, at 228 the Cooperative Index Manager 106 creates the Precise Index 108. Said Precise index 108 may be associated with a Container 109 on a Storage Device 104, or, in some embodiments, multiple Containers 109 across a plurality of Storage Devices 104. As noted above, the Precise Index 108 may be created partially or completely at 228, and it can be created statically or dynamically.

At 244 the Approximate Index Manager 114 of a Storage Device creates an Approximate Index 110 of the type determined at 240. Optionally, if necessary in some example embodiments, a new container may also be created with index creation. In some embodiments of the present invention having more than one Storage Device 104 being used, the Approximate Index Managers 114 of the individual Storage Devices 104 may all create Approximate Indexes 110 associated with the Containers 109. Optionally, if necessary in some example embodiments, creation of multiple Containers 109 on multiple Storage Devices 104 may take place in a sequence or in parallel. Similarly, 244 may, within the scope of the present invention, take place before, concurrently with, or after the creation of the Precise Index 108 at 228. Here, it is important to note that container or containers may already exist in the storage device prior to the creation of the corresponding Approximate Index or Approximate Indexes. The container or containers may be newly created concurrently with the corresponding Approximate Index or Approximate Indexes if they do not already exist.

Once the creation of the Approximate Index 110 and the Precise Index 108 has been completed, the Cooperative Index 116 has been created. In embodiments of the present invention with more than one Approximate Index 110 is used, the Cooperative Index 116 is created once at least one of the Approximate Indexes 110 have been completed.

According to embodiments of the present invention, the System 100, including the Storage System 102 and the Storage Device 104 may receive one or more requests to store data from external electronic devices in electronic communication with the System 100, and store the data as discussed above. Similarly, the System 100, including the Storage System 102 and the Storage Device 104 may receive one or more requests to retrieve data from the System 100 for transmission to an external device in electronic communication with the System 100, for output and/or display by the external device.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

Although this disclosure has been described in certain specific embodiments, those skilled in the art will have no difficulty devising variations to the described embodiment, which in no way depart from the scope of the present disclosure. Furthermore, to those skilled in the various arts, the disclosure itself herein will suggest solutions to other tasks and adaptations for other applications. It is the applicant's intention to cover by claims all such uses of the disclosure and those changes and modifications which could be made to the embodiments of the disclosure herein chosen for the purpose of disclosure without departing from the scope of the disclosure. Thus, the present embodiments of the disclosure should be considered in all respects as illustrative and not restrictive, the scope of the disclosure to be indicated by the appended claims and their equivalents rather than the foregoing description.

What is claimed is:

1. A method for managing system resources, the method comprising:
   receiving, by a storage device, a Quality of Service (QoS) parameter from a host;
   selecting, by the storage device, a first index type, from among index types, for a first index based on the QoS parameter and a computational load metric, the index types comprising one index type having an index structure that is a tree structure, a list structure, or a hash structure, and that is different from an index structure of another index type of the index types;
   sending, by the storage device, feedback to the host regarding the first index type for the host to use in identifying a second index type for a second index to manage a computational load placed on the storage device in processing a user request for a data stored on the storage device; and
   accessing the data, by the storage device, using the first index based on a processing of the user request, by the host, using the second index.

2. The method of claim 1, wherein the computational load metric comprises at least one of a storage device memory, a storage device capacity, a storage device performance, or a storage device storage medium.

3. The method of claim 1, wherein the storage device has fewer computational resources than the host.

4. The method of claim 1, wherein:
   the first index is created by the storage device and located at the storage device, and
   the second index is created by the host and located at the host.

5. The method of claim 1, wherein the host uses the feedback to select, from among index types, the second index type to complement the first index.

6. The method of claim 1, wherein the host uses the second index to make a determination to access the first index.

7. The method of claim 1, wherein a computational load placed on the storage device in processing the user request as a result of sending the feedback to the host is less than a computational load placed on the storage device in processing the user request without sending the feedback to the host.

8. A method for managing system resources, the method comprising:
   sending, by a host, a Quality of Service (QoS) parameter to a storage device to use in identifying a first index type for a first index;

receiving, by the host, feedback from the storage device regarding the first index type;

selecting, by the host, a second index type, from among index types, for a second index to manage a computational load placed on the storage device in processing a user request for a data stored on the storage device, the index types comprising one index type having an index structure that is a tree structure, a list structure, or a hash structure, and that is different from an index structure of another index type of the index types;

processing, by the host, the user request using the second index; and causing the storage device to access the data using the first index.

9. The method of claim 8, wherein the storage device has fewer computational resources than the host.

10. The method of claim 8, wherein:

the first index is created by the storage device and located at the storage device; and the second index is created by the host and located at the host.

11. The method of claim 8, wherein the host uses the feedback to select, from among index types, the second index type to complement the first index.

12. The method of claim 8, wherein the host uses the second index to make a determination to access the first index.

13. The method of claim 8, wherein a computational load placed on the host in processing the user request as a result receiving the feedback from the storage device is greater than a computational load placed on the host in processing the user request without receiving the feedback from the storage device.

14. A storage system comprising:

a host;

a storage device;

a processor; and a memory, wherein the host is configured to send a Quality of Service (QoS) parameter to a storage device, wherein the storage device is configured to identify a first index type, from among index types, for a first index based on the QoS parameter and a computational load metric, the index types comprising one index type having an index structure that is a tree structure, a list structure, or a hash structure, and that is different from an index structure of another index type of the index types, wherein the host is configured to receive feedback from the storage device regarding the first index type and identify a second index type for a second index to manage a computational load placed on the storage device in processing a user request for a data stored on the storage device, wherein the host is configured to process the user request using the second index, and wherein the storage device is configured to access the data using the first index data structure based on the processing, by the host, of the user request using the second index.

15. The storage system of claim 14, wherein the computational load metric comprises at least one of a storage device memory, a storage device capacity, a storage device performance, or a storage device storage medium.

16. The storage system of claim 14, wherein the storage device has fewer computational resources than the host.

17. The storage system of claim 14, wherein:

the first index is created by the storage device and located at the storage device; and the second index is created by the host and located at the host.

18. The storage system of claim 14, wherein the host uses the feedback to select, from among index types, the second index type to complement the first index.

19. The storage system of claim 14, wherein the host uses the second index to make a determination to access the first index.

20. The storage system of claim 14, wherein a computational load placed on the storage device in processing the user request as a result of sending the feedback to the host is less than a computational load placed on the storage device in processing the user request without sending the feedback to the host.

* * * * *